United States Patent

Welsch et al.

[11] Patent Number: 5,048,046
[45] Date of Patent: Sep. 10, 1991

[54] CATHODE AND CATHODE MOUNT FOR A GAS LASER

[75] Inventors: Wolfgang Welsch, Baldham; Hans Krueger, Munich; Klemens Huebner, Ottobrunn; Rudolf Haeusler, Munich, all of Fed. Rep. of Germany

[73] Assignee: Siemens Aktiengesellschaft, Munich

[21] Appl. No.: 564,736

[22] Filed: Aug. 6, 1990

[30] Foreign Application Priority Data

Sep. 27, 1989 [DE] Fed. Rep. of Germany ....... 3932254

[51] Int. Cl.$^5$ .............................................. H01S 3/097
[52] U.S. Cl. ........................................ 372/87; 372/61; 372/65
[58] Field of Search ...................... 372/61, 65, 92, 87

[56] References Cited

U.S. PATENT DOCUMENTS

| | | | |
|---|---|---|---|
| 3,739,297 | 6/1973 | Mark | 372/61 |
| 3,766,487 | 12/1973 | Roex | 372/61 |
| 3,784,927 | 1/1974 | Rudolph | 372/65 |
| 3,988,698 | 10/1976 | Crane et al. | 372/65 |
| 4,203,080 | 5/1980 | Wright et al. | 372/65 |
| 4,311,969 | 1/1982 | Kolb | 331/94.5 D |
| 4,644,554 | 2/1987 | Sheng | 372/65 |
| 4,823,356 | 4/1989 | Riley | 372/65 |
| 4,866,726 | 9/1989 | Ortiz et al. | 372/65 |

Primary Examiner—Leon Scott, Jr.
Attorney, Agent, or Firm—Hill, Van Santen, Steadman & Simpson

[57] ABSTRACT

A gas laser is provided having a cathode which is essentially tubularly designed and surrounds an end of a laser capillary which faces toward it. The cathode has a tube termination which serves the purpose of protecting tube parts situated there behind from the plasma of the laser. It surrounds a beam passage opening which insures that the laser beam can pass through in unattenuated fashion. This beam passage opening can be made smaller and the shielding can thus be improved since an extension of the mount for the optical elements of the laser projects into the interior of the laser, and the cathode is fixed to the extension at least in a radial direction. The invention is particularly suited for helium-neon lasers.

14 Claims, 2 Drawing Sheets

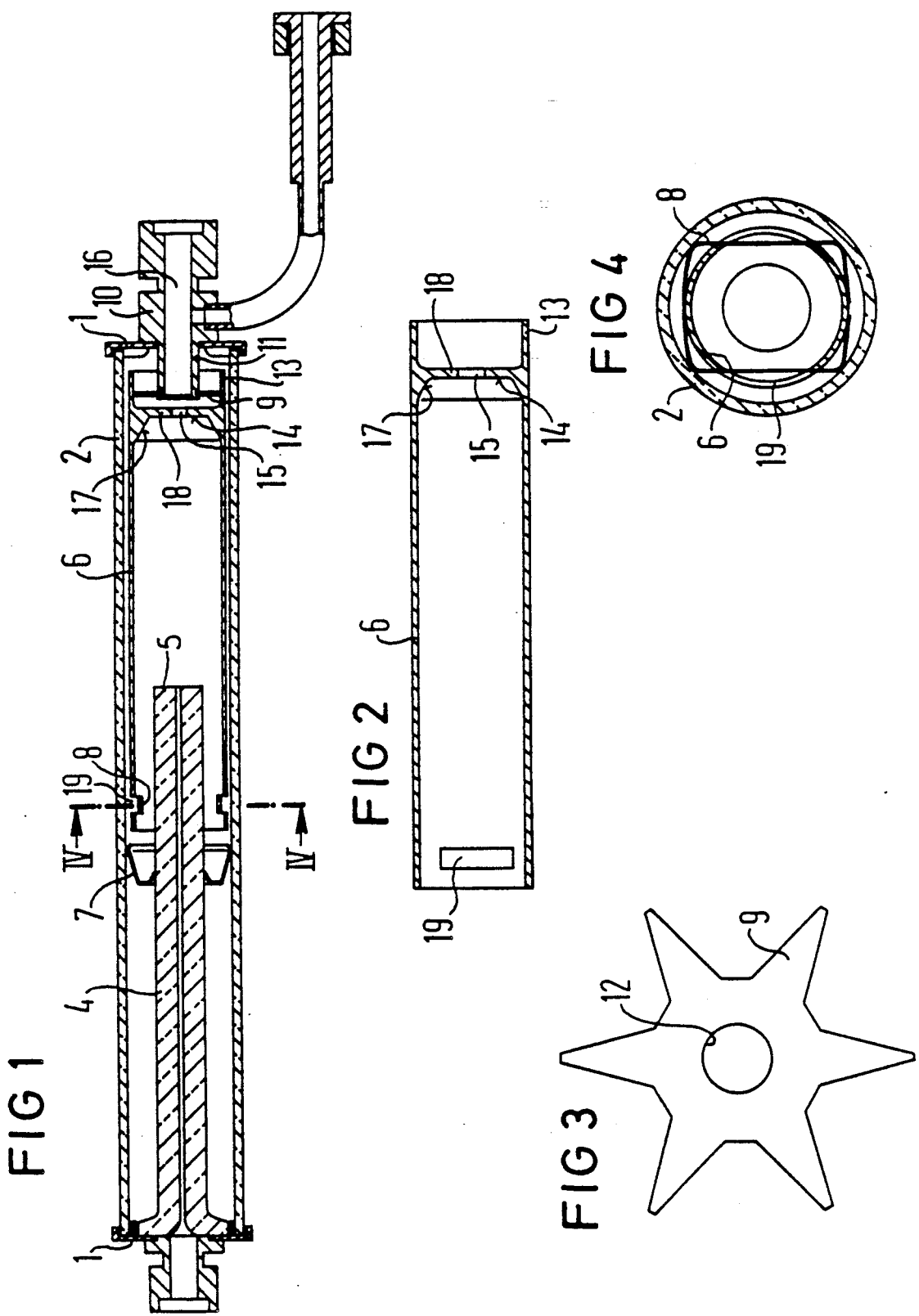

CATHODE AND CATHODE MOUNT FOR A GAS LASER

BACKGROUND OF THE INVENTION

The present invention is directed to a cathode and to a cathode mount in a gas laser having a housing tube with end pieces at opposite ends thereof, the end pieces receiving mounts for optical elements such as resonator mirrors or Brewster windows. A capillary functioning as a discharge channel projects into the housing tube, and a cathode is also provided in the housing tube which surrounds an end of the capillary. Such a gas laser with cathode is disclosed by U.S. Pat. No. 4,311,969, incorporated herein by reference. There, a nose is applied to the cathode, this nose being pressed or riveted into a metal cap. The metal cap represents the face end of the gas laser. This embodiment does not yield a satisfactory hold and electrical contact for the cathode, since the electrical connection is also supposed to occur via the nose, and a loosening of the connection arises as a consequence of mechanical and thermal stresses. It has been particularly shown that a loosening of the connection can occur and can lead to failures due to the great shrinkage of the cathode (usually composed of aluminum) when cooling after every heating.

SUMMARY OF THE INVENTION

It is one object of the invention among others to provide a reliable contacting and holding of the cathode, and to improve a centering relative to the laser beam.

In a gas laser according to the invention, a mount received in an end piece at one end of the housing tube has an extension which projects into an interior of the gas laser housing tube. A beam passage opening is provided at an end of the cathode which is smaller than a bore of the mount and is positioned between the mount and the end of the capillary within the housing tube. The cathode is fixed to this extension.

An improvement of the centering of the cathode relative to the laser beam simultaneously yields the possibility of keeping the beam passage opening smaller, and thus of also considerably reducing the influence of the plasma on the parts lying behind the electrode. This is of great significance, particularly given a small spacing of the end of the capillary from the tube termination. According to the invention, a support on an extension the mount for the optical parts, i.e. for the Brewster windows and/or resonator mirrors, reduces the deviations from a rated dimension to a minimum. Since the cross sectional area increases with the square of the radius and the scattering angle for the plasma particles incident from the capillary onto the beam passage opening has a great effect upon the particles, every reduction in the size of the beam passage opening involves a considerable improvement of the power or performance and of the useful life of the laser. It is particularly the sputtering of material that could deposit on the optical elements that is particularly completely avoided based on the techniques of the invention. Relatively inexpensive and easily workable steel can thus be utilized for the mount material. Only when the resonator mirrors are to be inserted into the mount can it be expedient to fabricate the last part of the mount of a material adapted to the coefficient of expansion of the mirror.

A retaining tube is advantageously attached to the cathode at that side of the tube termination facing away from the capillary, and this retaining tube is supported against the extension. This advantageously occurs since the retaining tube has the same outside diameter as the cathode, and a toothed disk is secured to the extension such that the teeth end on a circle concentric with the extension, and the toothed disk is inserted into the retaining tube. In what is likewise an advantageous second embodiment, the extension contains an annular groove, and the retaining tube has its diameter matched to the extension which is slipped thereover. At least one depression is provided in a radial direction in the retaining tube in the region of the extension, and a spring presses into this depression.

The two described embodiments utilize the high thermal expansion of the cathode material, which is usually aluminum, since the electrodes contract more greatly during cooling than the parts situated in the interior of the retaining tube, and thus further increase the pressure during cooling and improve the contact. Since the operating temperature lies under the temperature reached when closing the housing, this good connection is preserved. This is particularly true when manufacturing the laser housing in glass solder technology since the entire tube is heated to the soldering temperature of usually about 500° C. in this method, particularly given batch soldering.

The retaining tube matched to the extension in the second embodiment advantageously comprises slots proceeding in an axial direction from its end face, whereby the depression is annular and the spring is an annular spring. The spring cannot bend the lamellae formed by the slots to a noteworthy degree in the cold condition, but produces an adequate contact pressure between the lamellae and the extension at soldering temperature. This embodiment is especially advantageous for lasers manufactured in glass solder technology since the spring power of aluminum or of aluminum alloys already greatly decreases at the soldering temperature. In the cold condition, the lamellae and the spring can be easily slipped onto the extension; and a high-strength spring-actuated connection is produced during the soldering process.

An advantageous improvement of the invention is that the tube termination contains an annular region in the proximity of the beam passage opening, this annular region proceeding perpendicularly to the axis of the capillary as seen from the capillary, or distancing itself from the capillary end with increasing radius. Dust that is situated in the tube and that can fall onto the optical elements when the tube is handled is thus held back or at least not forwarded as the result of this development. The latter occurs in the prior art as soon as electrode terminating structures arched in the direction to the mount are utilized. Even the slightest quantities of dust on a mirror or Brewster window of a laser are thus already enough to considerably deteriorate its efficiency. This is based on the known fact that the laser beams are very frequently reflected back and forth, particularly when the intensification is relatively slight. For example, this is the case in helium-neon lasers.

It is especially advantageous for a laser constructed in glass solder technology when the cathode comprises at least one resilient support in a radial direction relative to the housing tube. The spring power of this support is set such that the weights arising during the soldering process as a consequence of the melting of the solder between the end piece and the housing tube suffice in order to overcome the friction produced by the spring. The spring is therefore preferably an undular washer that lies in a deformation of the cathode that is radially formed inwardly therein in the direction towards the axis. In another advantageous embodiment, the spring is essentially bent in rectangular fashion and presses against the housing tube when it is positioned in slots of the cathode that lie opposite one another with reference to the axis of the cathode. These two embodiments permit a low pressing power that is just adequate for centering the cathode, but guarantees a faultless gliding when being soldered together. This is basically not the case given the springs known from the prior art since these springs are not held in the axial direction by the cathode, and, for this very reason, have a high spring power since they dare not dislocate given acceleration stresses after manufacture.

The mount is advantageously formed of simple, easily workable steel, whereby the diameter of its bore is larger than the beam passage opening. As a result of the extremely small beam passage opening, the plasma is kept away so well that simple steel can be employed for the mount.

BRIEF DESCRIPTION OF THE DRAWINGS

FIG. 1 shows a cathode of the invention in a helium-neon laser;

FIG. 2 shows a cathode of the invention in a sectional view;

FIG. 3 shows a toothed disk for fastening the cathode to an extension of the mount;

FIG. 4 shows a section through a support in a radial direction relative to the housing wall;

DESCRIPTION OF THE PREFERRED EMBODIMENTS

Figure 5:
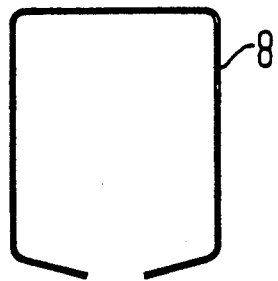
FIG. 5 shows a spring for the embodiment of FIG. 4.

End pieces 1 and a housing tube 2 of a gas laser are soldered to one another with glass solder technology. The end pieces 1 are designed as metal caps that surround the housing tube 2. A toothed disk 9 is rigidly connected to an extension 11 of a mount 10 for optical elements, such as for a resonator mirror in the present case. The connection in the present case has occurred by plugging the toothed disk 9 onto a diameter shoulder of the extension 11 and by beading or riveting this diameter shoulder. A precise position of the toothed disk 9 thus results. In the present case, the toothed disk 9 is designed as a star disk. The shape of the teeth can be arbitrary, as can be their number. The only thing important is that the tips of the teeth lie on a circle that is concentric with the inside hole 12 of the toothed disk 9.

The toothed disk 9 is inserted into a retaining tube 13 of the cathode 6, whereby the retaining tube 13 has the same outside diameter as the remaining part of the cathode 6. A tube termination 14 that has a beam passage opening 15 is arranged between the end 5 of the capillary 4 and the extension. The beam passage opening 15 is smaller than the bore 16 in the mount 10. It guarantees that no plasma approaches the walls of the mount, and that no sputtering and no other damage to the mount 10 can arise. It thus becomes possible to utilize simple, easily worked steel for the mount 10. This considerably reduces the expense of the tube. In addition to comprising a part 18 perpendicular to the axis, the tube termination 14 has an oblique part 17 that enables an improved distribution of the electron current over the cathode but, at the same time, does not promote the conveying of dust into the beam passage opening. Over and above this, the part 18 of the cathode termination 14 perpendicular to the beam direction serves as an interceptor for dust particles.

In the illustrated embodiment, in glass solder technology a support of the cathode 6 vis-a-vis the housing tube 2 with a spring 8 having low spring power is provided. The spring 8 lies in slots 19 of the cathode 6 and is held and entrained in the axial direction by the cathode 6. The pressing power of the spring 8 is dimensioned so that it can center the cathode 6 in an axial direction but also so that it can dislocate along an axial direction due to the weight of the tube parts pressing on it. As a result thereof, it is adequate to execute the glass solderings under the force of gravity. This enables the employment of batch soldering without special, additional techniques. The spring 8 is formed of an approximately rectangularly bent strip of metal, whereby the ends of the strip are bent outwardly at a small angle. A symmetrical force distribution thus results after being slipped onto the cathode. The capillary 4 can be additionally supported against the housing tube 2 by a spring ring 7.

Figure 6:
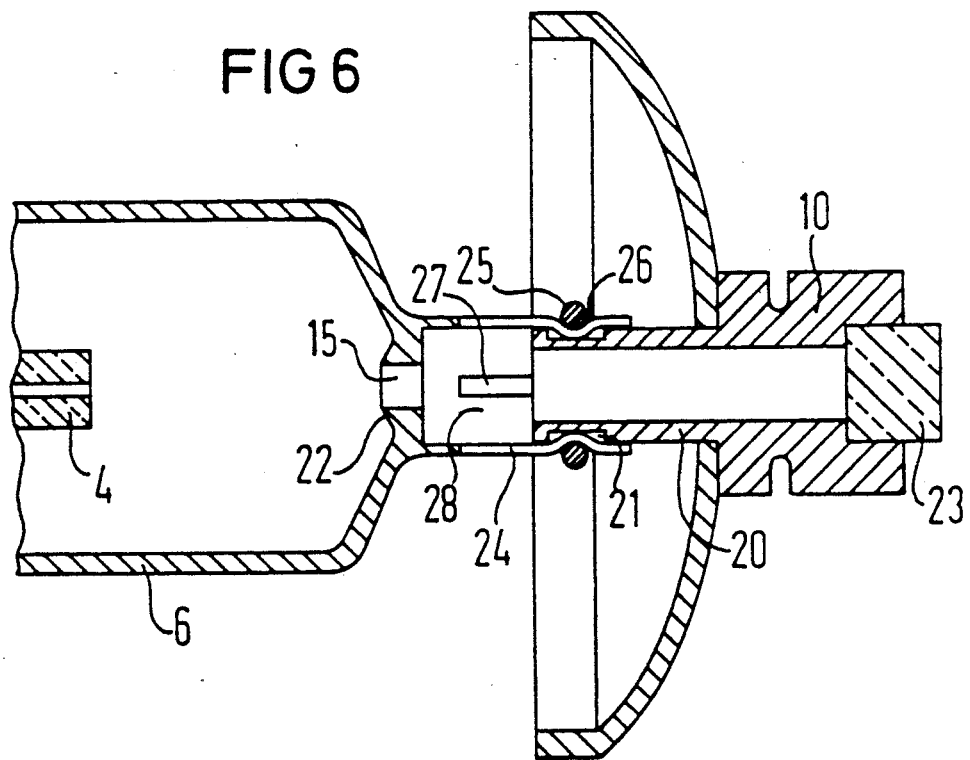
FIG. 6 shows a further example of a fastening of a cathode to the extension of the mount.

According to FIG. 6, a mount 10 for a mirror is provided with an extension 20 that comprises an annular groove 21. In the region of the cathode termination 22, the cathode 6 has a slanting region in which, together with the radius, the distance from the capillary 4 is also increased. This region keeps dust away from the mirror 23. The retaining tube 24 has its diameter matched to the extension 20. As viewed from its end face, it is slotted and has depressions 26 that project into the groove 21. The lamellae 28 separated by the slots 27 are pressed by a spring ring 25 against the extension 20 and into the groove 21. The depression 26 can thus already be attached before assembly. However, it can also occur that the aluminum of the lamellae 28 softens to such an extent during the glass soldering process that the spring ring 25 is in position to press the lamellae 28 in and to form the depression 26. In the later case, one work pass in the manufacture of the electrode is saved.

Although various minor changes and modifications might be proposed by those skilled in the art, it will be understood that we wish to include within the claims of the patent warranted hereon all such changes and modifications as reasonably come within our contribution to the art.

We claim as our invention:

1. A gas laser tube structure, comprising:
   a housing tube having first and second end pieces at opposite ends thereof terminating said housing tube;
   the second end piece having a mounting means attached thereto for attachment of an optical element, said mounting means having a bore;
   a capillary as a discharge channel adjacent said first end piece and positioned in said housing tube;
   a substantially cylindrical cathode in the housing tube, said cathode surrounding an end of the capillary within the housing tube, and said cathode having a tube termination spaced in an axial direction from an end face of the capillary, said tube termination having a beam passage opening;
   said mounting means having an extension projecting into an interior of the housing tube;

said cathode having a retaining tube extending from a region of the tube termination in a direction facing away from the capillary end face and towards said mounting means, and means for connecting said cathode retaining tube to said extension and for supporting said cathode retaining tube by said extension; and said beam passage opening of said tube termination being smaller than said bore of said mounting means and said beam passage opening of the tube termination being positioned between said mounting means and said capillary end face so that plasma passing through the beam passage opening during operation is kept away from walls of the bore.

2. A gas laser tube structure according to claim 1 wherein the retaining tube has a same outside diameter as an outside diameter of the cathode surrounding the capillary; a toothed disk being secured to the extension such that teeth of the disc lie on a circle concentric with the extension; and the toothed disk being received into the retaining tube.

3. A gas laser tube structure according to claim 1 wherein the extension has an annular groove; the retaining tube has its inside diameter corresponding to an outside diameter of the extension so that it fits closely to the extension and is slipped thereover; at least one depression is provided in the retaining tube in a radial direction in a region of the annular groove; and spring means for pressing into said depression.

4. A gas laser tube structure according to claim 3 wherein the retaining tube has slots proceeding in an axial direction from an end face thereof so as to form flexible lamellae; the depression being annular; and the spring means being an annular spring which when not heated cannot substantially bend the lamellae formed by the slots but which produces an adequate contact pressure between the lamellae and the extension at a soldering temperature for soldering the end piece to an end of the housing tube.

5. A gas laser tube structure according to claim 1 wherein the tube termination has an annular region in a proximity of the beam passage opening, said annular region being substantially perpendicular to a longitudinal axis of the capillary.

6. A gas laser tube structure according to claim 1 wherein at least one resilient support means is provided for said cathode in radial traction relative to the housing tube; and a spring power of the support means being set such that a weight of the cathode and second end piece with the mounting means is sufficient to allow a slippage of the cathode relative to the housing during a soldering process as the second end piece is glass-soldered to the end of the housing tube.

7. A gas laser tube structure according to claim 6 wherein the resilient support means is a springy undular washer which is positioned in a deformation of the cathode formed radially inwardly in a direction towards its longitudinal axis.

8. A gas laser tube structure according to claim 6 wherein the support means comprises a spring bent in a substantially rectangular shape and which is positioned in slots of the cathode that lie opposite one another relative to a longitudinal axis of the cathode, said spring pressing against the housing tube.

9. A gas laser tube structure according to claim 1 wherein the mounting means attached to the second end piece comprises an easily workable steel.

10. A gas laser tube structure, comprising:

a housing tube having first and second end pieces at opposite ends thereof;

the second end piece having a mounting means attached thereto and having a bore therein;

a capillary as a discharge channel adjacent said first end piece and positioned in said housing tube;

a cathode in the housing tube, said cathode having a termination portion spaced in an axial direction from an end face of the capillary, said termination portion having a beam passage opening therein, and the cathode having a retaining tube extending from the termination portion towards said second end piece;

said mounting means having an extension projecting into the housing tube;

means for connecting the extension to the retaining tube without soldering or welding such that the extension supports the cathode via the retaining tube; and said beam passage opening of said tube termination being spaced from said bore of said mounting means by said retaining tube, and said opening being smaller than said bore.

11. A gas laser tube structure, comprising:

a housing tube having first and second end pieces at opposite ends thereof terminating said housing tube;

the second end piece having a mounting means attached thereto for attachment of an optical element, said mounting means having a bore;

a capillary as a discharge channel adjacent said first end piece and positioned in said housing tube;

a substantially cylindrical cathode in the housing tube, said cathode having a tube termination at an end nearest the housing tube second end piece, said tube termination having a beam passage opening;

said mounting means having an extension projecting into an interior of the housing tube;

said cathode having a retaining tube extending from a region of said tube termination and receiving said extension therein;

said beam passage opening of said tube termination being smaller than said bore of said mounting means so that plasma passing through the beam passage opening during operation is kept away from walls of the bore; and the retaining tube having an inner circumference larger than an outside circumference of said extension and wherein a supporting means is provided which extends between said outer circumference of the extension and said inner circumference of the retaining tube for centrally positioning and supporting the extension within the retaining tube and for supporting the cathode by the extension.

12. A tube structure according to claim 11 wherein the supporting means provides a solderless mechanical support in the form of a disk-like structure secured to the extension with an outer circumference of the disk being received within the retaining tube.

13. A gas laser tube structure, comprising:

a housing tube having first and second end pieces at opposite ends thereof terminating said housing tube;

the second end piece having a mounting means attached thereto for attachment of an optical element, said mounting means having a bore;

a capillary as a discharge channel adjacent said first end piece and positioned in said housing tube;

a substantially cylindrical cathode in the housing tube, said cathode having a tube termination at an end nearest the housing tube second end piece, said tube termination having a beam passage opening;

said mounting means having an extension projecting into an interior of the housing tube;

said cathode having a retaining tube extending from a region of the tube termination and overlapping said extension;

said beam passage opening of said tube termination being smaller than said bore of said mounting means so that plasma passing through the beam passage opening during operation is kept away from walls of the bore; and the retaining tube having an inner circumference substantially the same as an outside circumference of said extension such that the retaining tube fits closely in abutting contact around the extension, and retaining means being provided for rigidly securing the retaining tube to the extension so that the extension supports the cathode by its retaining tube.

14. A tube structure according to claim 13 wherein the retaining means comprises slots in the retaining tube and a clamping means acting on an outer circumference of the retaining tube.

* * * * *